J. C. KNIGHTS.
Machines for Trimming and Burnishing Boot and Shoe Sole Edges.

No. 157,476.    Patented Dec. 8, 1874.

WITNESSES.

INVENTOR.

N. C. Lombard
Wm. P. Edwards

J. C. Knights

UNITED STATES PATENT OFFICE.

JAMES C. KNIGHTS, OF STONEHAM, ASSIGNOR TO BOOT AND SHOE MACHINERY MANUFACTURING COMPANY, OF BOSTON, MASSACHUSETTS.

IMPROVEMENT IN MACHINES FOR TRIMMING AND BURNISHING BOOT AND SHOE SOLE EDGES.

Specification forming part of Letters Patent No. 157,476, dated December 8, 1874; application filed September 17, 1874.

*To all whom it may concern:*

Be it known that I, JAMES C. KNIGHTS, of Stoneham, in the county of Middlesex and State of Massachusetts, have invented certain new and useful Improvements in Machines for Trimming and Burnishing the Edges of Boot and Shoe Soles, of which the following, taken in connection with the accompanying drawings, is a specification:

My invention relates to the construction of the cutting and burnishing tools, and is an improvement upon the machine patented to Louis Coté, February 11, 1873, and numbered 135,694; and it consists, first, in the use, in combination with a cutting-tool provided with a series of cutters projecting from the periphery of a central hub or sleeve, all made from one piece of metal, of a guide-disk attached to one end of said cutting-tool, and projecting beyond the cutting-edge of said cutting-tool, and having a recess or recesses sunk in its inner face to receive the ends of the cutters, so that the metal of the disk shall overlap the end of the cutters, as will be further described. My invention further consists in the use of a cutting-tool having a series of cutters arranged around a central hub or sleeve, all made from one piece of metal, each of said cutters having its outer edge beveled, so as to form a chisel-shaped cutting-edge, as will be described.

Figure 12:
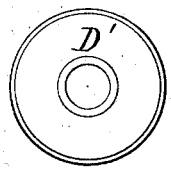
Figure 11:
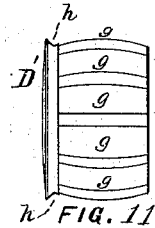
Figure 10:
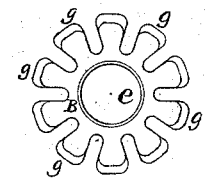
Figure 13:
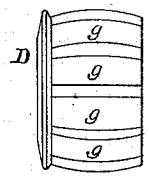
Figure 4:
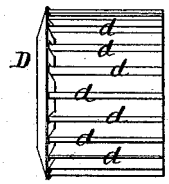
Figure 3:
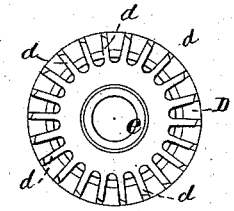
Figures 5, 6:
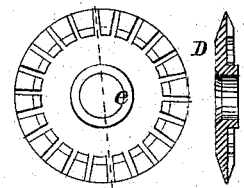
Figure 9:
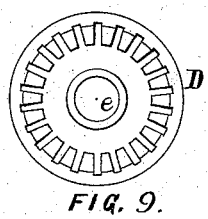
Figure 8:
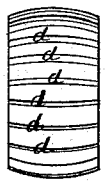
Figure 7:
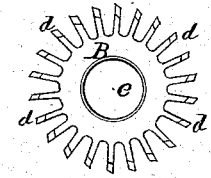
Figure 1:
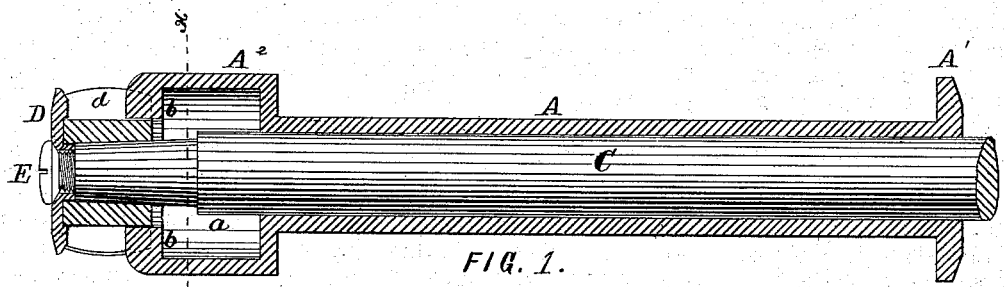
Figure 2:
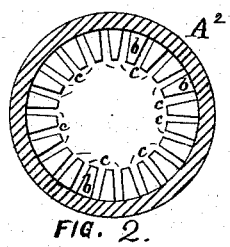

In the drawings, Figure 1 is a longitudinal section through the axis of the sleeve-gage and the trimming-tool, and showing a portion of the shaft in elevation. Fig. 2 is a transverse section of the sleeve-gage on line $x\,x$ on Fig. 1, looking toward the trimming or burnishing tool. Fig. 3 is an end view, and Fig. 4 is a side elevation, of a cutting-tool provided with straight beveled-edged cutters and its guide-disk. Fig. 5 is an elevation of the inner face of the guide-disk to match the straight cutter, and Fig. 6 is a section of the same on line $y\,y$ on Fig. 5. Figs. 7 and 8 are, respectively, an end view and a side elevation of a cutting-tool having curved or convex cutters. Fig. 9 is an elevation of the inner face of the guide-disk to fit the convex cutters. Fig. 10 is an end view of a burnishing-tool. Fig. 11 is a side elevation of the same with a guide-disk, provided with a bead, attached; and Fig. 12 is an elevation of the inner face of said guide-disk. Fig. 13 is an elevation of the same burnishing-tool, with a guide-disk attached having a plain beveled edge.

A is a sleeve, provided with the collar $A^1$ and gage-head $A^2$, in which is formed the chamber $a$, with the inwardly-projecting rib $b$, through which are cut the slits $c\,c$, to receive the ends of the cutters $d\,d$, which project radially, or nearly so, from the central hub B, as seen in Figs. 3 and 7. The portion of the sleeve A between the collar $A^1$ and gage-head $A^2$ is a journal, by which it is mounted in a bearing in the frame of the machine, (not shown in the drawings,) in which it revolves with the shaft C, a portion only of which is shown. The cutting or burnishing tools are made from a single piece of metal, with a series of teeth projecting from a common hub, B, which has a central hole, $e$, reamed to fit the taper end of the shaft C, where they are held in position by the clamping guide-disk D and the screw E, as seen in Fig. 1. In the cutting-tools, the blades which form the cutters $d\,d$ are made thin, with their sides nearly parallel, as shown, and have their outer edges ground beveling to form cutting-corners $d'\,d'$, the bevels all being in the same direction. The object of this construction is the easy production of a cutting-tool, from one piece of metal, that can be made of smaller diameter than would be practical with movable cutters, and at the same time retain all the advantages of the movable cutters as regards a good cutting-edge, an even temper, and facility of sharpening. In the burnishing-tool, the teeth $g\,g$ are made broader, and the outer edges of said teeth are rounded over in the direction of the circumference of the tool, as seen in Fig. 10. The outer periphery of the cutting and burnishing tools may be parallel to their axes or curved, as seen in Figs. 8, 11, and 13, according to the style of work it is desired to produce. The guide-disks D to be used with the cutting-tools have embossed or otherwise formed in their inner faces sunken recesses of an outline corresponding to the end view of the cutting-tools, into which said tools fit when secured to the shaft C in condition for operation, as seen in Figs. 1, 5, 6, and 9. These guide-disks, and one kind to be used with the burnishing-tools, have that portion of their inner faces which projects beyond the periphery of the tools beveled, as seen in Figs. 1, 4, 6, and 13. For one kind of work I apply to the burnishing-tool a guide-disk, D', having formed in its outer periphery a concave groove, $h$, for the purpose of forming a bead on the upper corner of the sole.

I am aware that straight cutting-tools provided with a series of cutters arranged radially around a central hub or sleeve, and made from one piece of metal, have been used before; and I am also aware that a clamping guide-disk has been used in connection with such cutting-tools, said guide-disk being a plain flat disk without recesses pressed against the end of the cutter by the clamping-screw, without overlapping the ends of the cutters, so as to break joints, and without having its projecting portion beveled upon the side next to the cutters; and, therefore, I do not claim such a cutter or guide-disk broadly, or the combination of the same; but

What I claim as new, and desire to secure by Letters Patent of the United States, is—

1. The guide-disk D, provided with a sunken recess or recesses to receive the ends of the series of cutters of the cutting-tool, substantially as described.

2. In a machine for trimming the edges of the heels or soles of boots or shoes, a cutting-tool having a series of cutters projecting from the periphery of a central hub or sleeve, of which they form a part, when said cutters have parallel or nearly parallel sides, and their outer edges beveled to form chisel-shaped cutting-corners $d'$, substantially as described.

Executed at Boston this 7th day of September, 1874.

J. C. KNIGHTS.

Witnesses:
N. C. LOMBARD,
WM. P. EDWARDS.